(12) United States Patent
Addy

(10) Patent No.: US 6,539,088 B1
(45) Date of Patent: Mar. 25, 2003

(54) ELECTRICAL CONNECTOR FOR CONNECTING AN AUDIO SOURCE TO A CALLER ON HOLD

(75) Inventor: William W. Addy, Chicago, IL (US)

(73) Assignee: Giant Communications, Inc., Chicago, IL (US)

( * ) Notice: Subject to any disclaimer, the term of this patent is extended or adjusted under 35 U.S.C. 154(b) by 0 days.

(21) Appl. No.: 09/522,382

(22) Filed: Mar. 10, 2000

(51) Int. Cl.[7] .......................... H04M 3/42; H04M 1/00; H04M 1/64; H04M 3/00; H01R 11/20
(52) U.S. Cl. ................. 379/215.01; 379/162; 379/67.1; 379/76; 379/308; 439/433
(58) Field of Search ................................ 379/215, 67.1, 379/99, 162, 76, 308; 439/433

(56) References Cited

U.S. PATENT DOCUMENTS

| | | | |
|---|---|---|---|
| 4,056,695 A | * 11/1977 | Angner et al. | ................. 379/99 |
| 4,149,042 A | 4/1979 | Balzer et al. | |
| 4,178,058 A | 12/1979 | Swenson | |
| 4,219,701 A | * 8/1980 | Feiner | ......................... 379/99 |
| 4,423,288 A | 12/1983 | Webb | |
| 4,429,187 A | 1/1984 | Butcher | |
| 4,577,067 A | 3/1986 | Levy et al. | |
| 4,588,865 A | 5/1986 | Hestad | |
| 4,703,497 A | 10/1987 | Ingalsbe | |
| 4,731,822 A | 3/1988 | Berry, III et al. | |
| 4,920,556 A | 4/1990 | Wong | |
| 4,946,010 A | 8/1990 | DiBono | |
| 4,953,204 A | 8/1990 | Cuschleg, Jr. et al. | |
| 5,083,935 A | * 1/1992 | Herman | ........................ 439/433 |
| 5,149,863 A | 9/1992 | Shimp et al. | |
| 5,309,505 A | 5/1994 | Szlam et al. | |
| 5,313,459 A | 5/1994 | Matern | |
| 5,511,112 A | 4/1996 | Szlam | |
| 5,590,185 A | 12/1996 | Sandler et al. | |
| 5,592,473 A | 1/1997 | Matern et al. | |
| 5,717,739 A | * 2/1998 | Dyer et al. | .................... 379/67 |
| 5,867,575 A | 2/1999 | Erickson | |
| 5,870,461 A | * 2/1999 | Hazenfield | .................. 379/162 |
| 5,914,863 A | 6/1999 | Shen | |
| 5,920,616 A | 7/1999 | Hazenfield | |
| 6,091,812 A | * 7/2000 | Iglehart et al. | ............. 379/308 |

* cited by examiner

Primary Examiner—Ahmad F. Matar
Assistant Examiner—Thjuan P Knowlin
(74) Attorney, Agent, or Firm—Brinks Hofer Gilson Lione

(57) ABSTRACT

A connector for use in a business telephone system such as a PBX, Key, or other type of system with audio on hold capabilities. The connector eliminates the need for time consuming stripping, splicing, and manual connecting operations typically done by the installation technicians. The connector, thereby, decreases the time necessary to install a business phone system with audio on hold capabilities, and eliminates the hazard of accidental shorting which can cause unwanted down time for the system. The connector directly connects the output from an audio source to the designated location on a telecommunications connecting block and therefore to the KSU of the telephone system, thus allowing a caller on hold to listen to, e.g., music, an advertisement, or the radio.

30 Claims, 4 Drawing Sheets

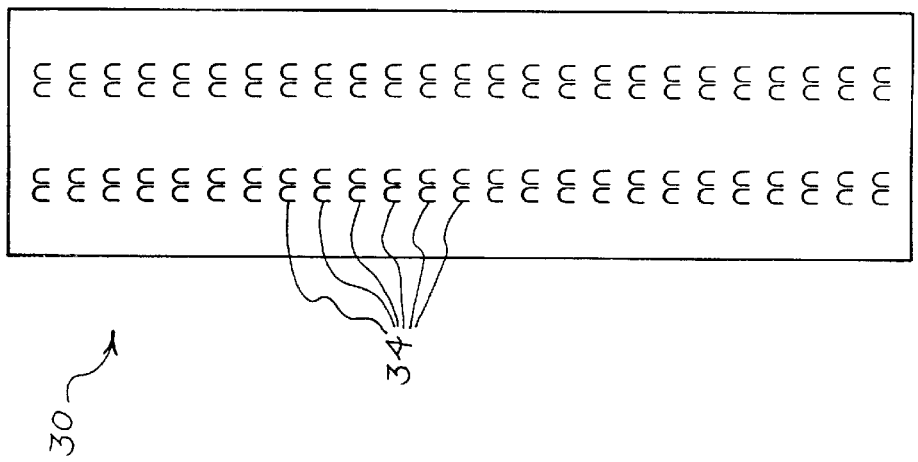
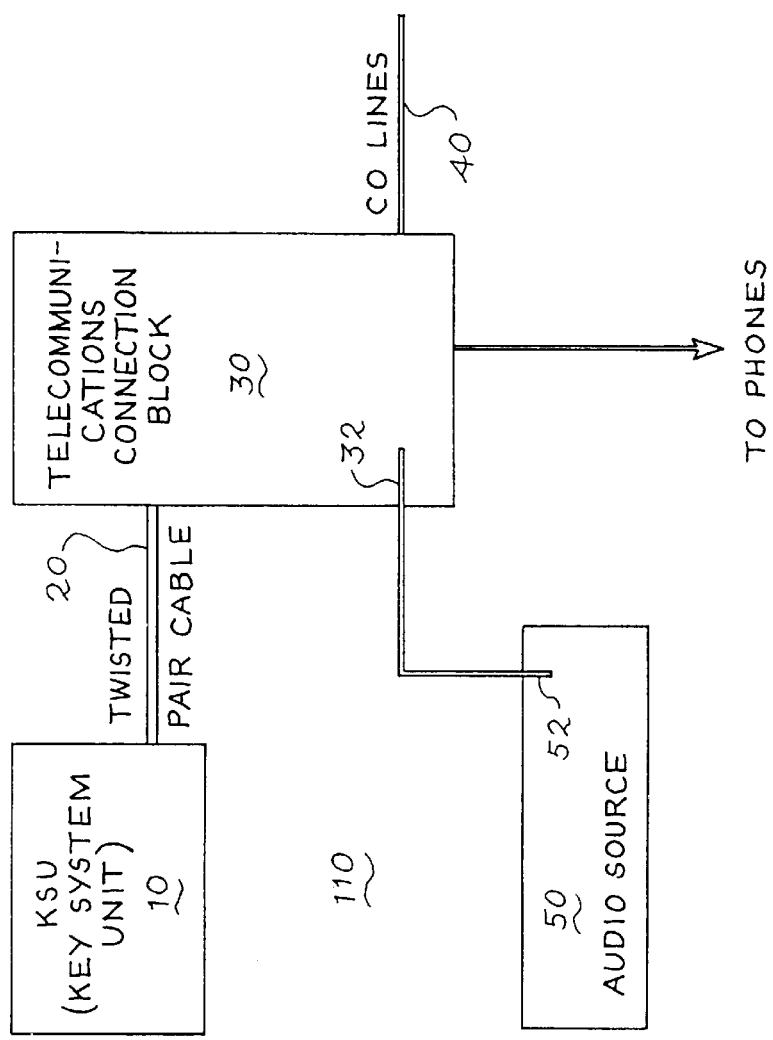

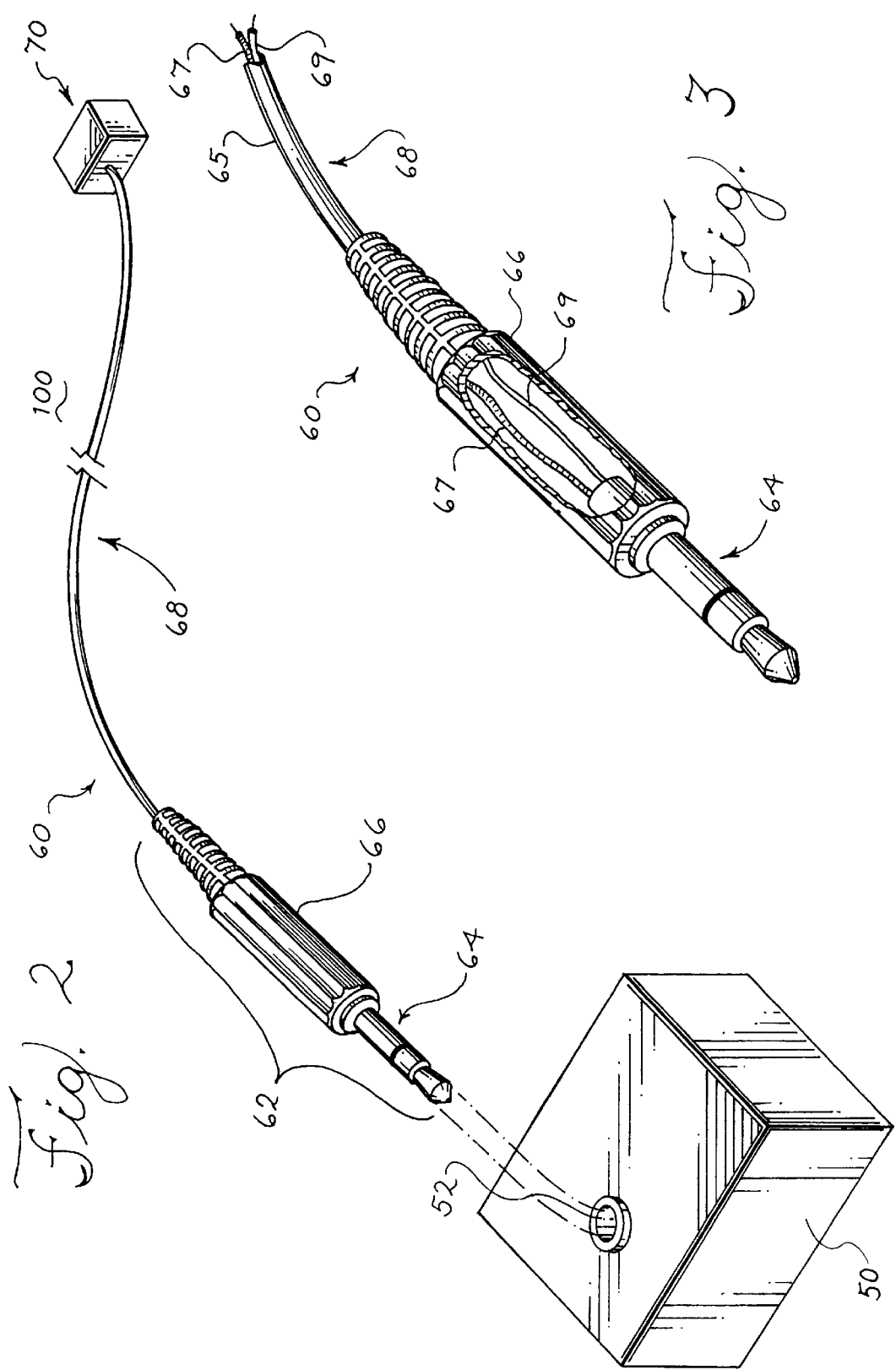

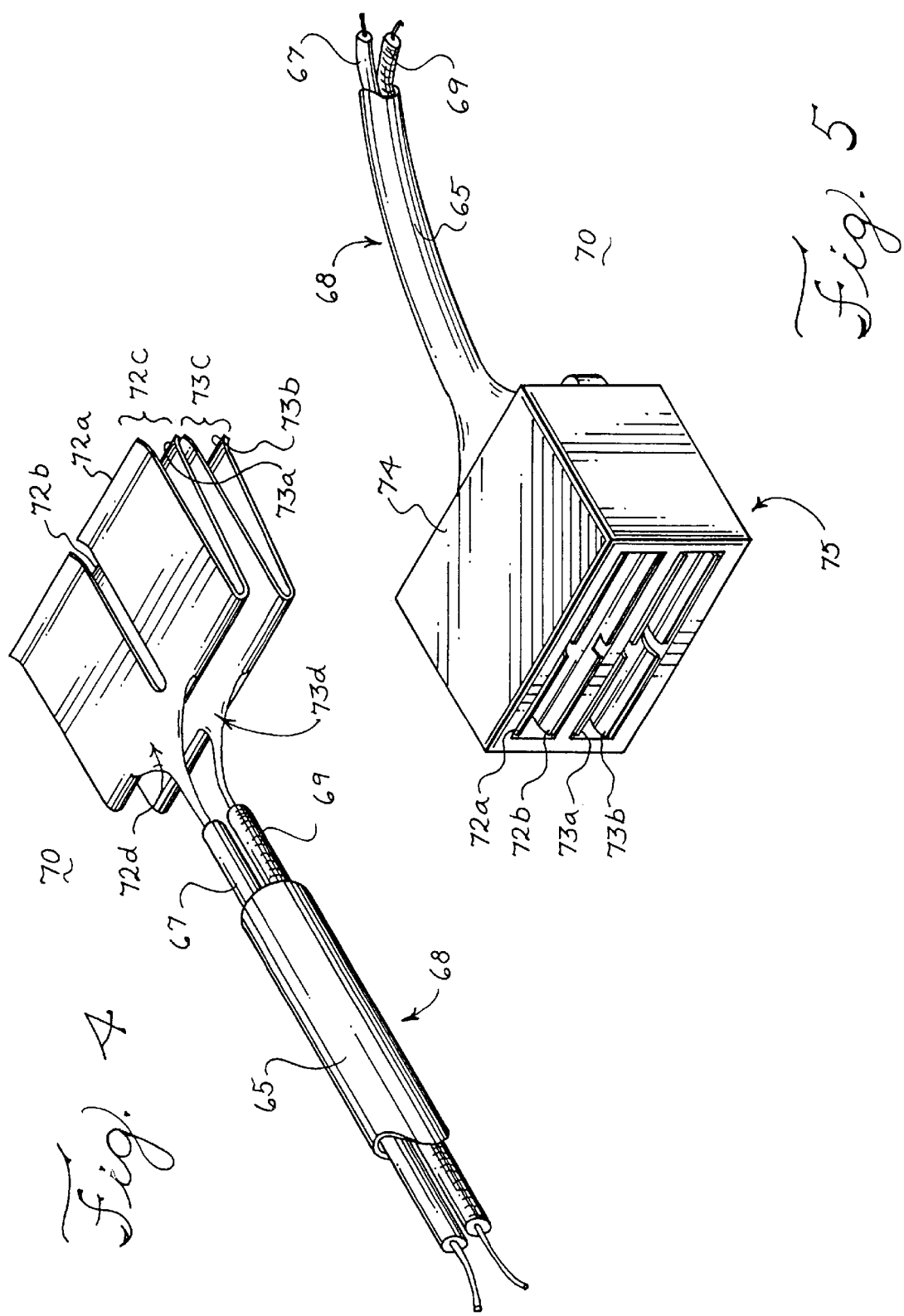

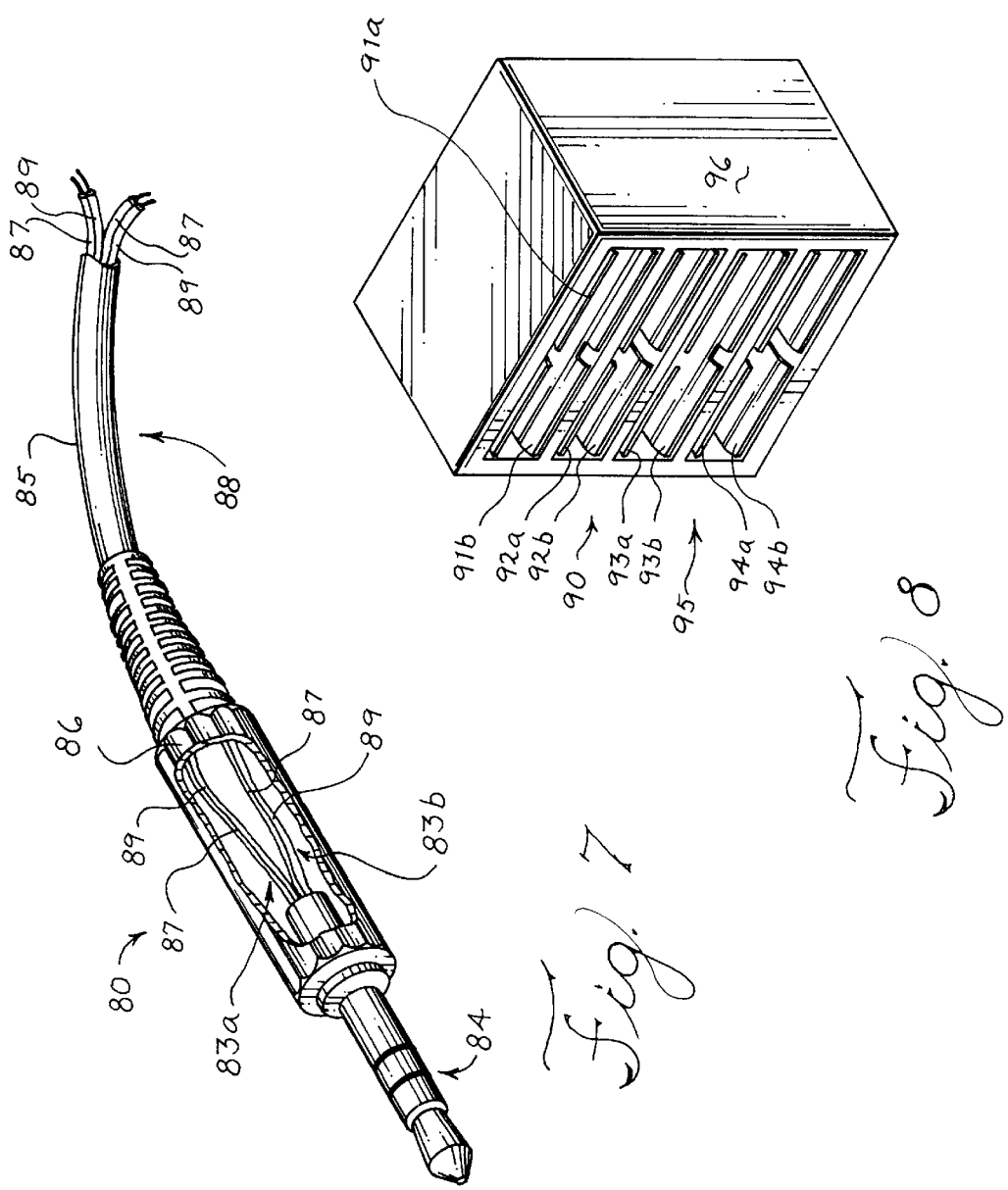

ELECTRICAL CONNECTOR FOR CONNECTING AN AUDIO SOURCE TO A CALLER ON HOLD

FIELD OF THE INVENTION

The present invention relates to on-hold audio capability for business telephone systems, and particularly a connector for connecting an audio source to the business telephone system and thus providing audio input to a caller on hold.

BACKGROUND

Modern business telephone systems such as a PBX or Key systems have the capability to place a caller on hold, awaiting further disposition, and to play music, a pre-recorded message, an advertisement, or the radio for the caller to listen to while the caller remains on hold. The computer or central processing unit that is operating the business telephone systems is sometimes called a key system unit or KSU. The KSU is generally connected via a group of wires called a twisted pair cable to a telecommunications connecting block. The telecommunications connecting block has several ports each having a pair of contact pegs. The telecommunications connecting block also receives the central office lines or CO lines, and the telecommunications connecting block receives input from an audio source. An incoming call is received from the CO lines into the telecommunications connecting block and is directed by the KSU to a particular phone extension. If the particular extension is not accepting calls for one reason or another, the incoming call is placed "on hold," waiting for the destination extension to. become available. While the incoming call is on hold, the KSU relays the input from the audio source to the call on hold, and the caller on hold hears the music or other information provided by the audio source.

The audio source can be any type of audio device such as a CD player, a tape player, or a receiver. Generally, the audio source is purchased separately from the business telephone unit and requires special connection to the telecommunications connecting block and hence to the telephone unit to be functional as a music or audio on hold source.

Prior to the present invention, when a business phone system was installed and the music or other type of audio on hold option was desired, the installation technician had to perform timely stripping and splicing of delicate stranded wires in order to connect the separate audio source with the phone system via the telecommunications connection system. For example, one prior art method of installation of one type of phone system with the audio on hold option required the following steps:

A set of headphones or some other type of audio receiver having a cable terminating in a stereo or mono miniplug, video jack, or other type of audio jack at a first end is acquired. The headphones or other device at the second end of the cable is unnecessary to complete installation and should be cut off, leaving just the miniplug on the first end and exposed wire at the second or a free end. If the cable is a stereo cable, it will have two insulated wires extending from the miniplug. One of these wires may be unnecessary because many phone systems only support mono audio input. In these instances, one of the wires in the cable can be removed. Next, at the free end of the cable, the sheathing is carefully removed so as not to harm the delicate stranded copper wire underneath. Removal of the sheathing reveals two types of internal wire: stranded copper wire and stranded copper wire with sheathing. Next the two sets of internal copper wire are separated, and each wire is meticulously wrapped around one of the pegs from a pair of contact pegs on the telecommunications connecting block that represents the position of the audio source. When wrapping the stripped wires around the each peg in the designated pair on the telecommunications connecting block, if even one of the strands wire from one peg touches the other peg, it may cause the phone system to short resulting in damage to the system and inconvenience to the user, but in any event, such an occurrence will delay completion of the installation.

There are other ways to connect an audio source to a telephone system known in the art; however, each of those alternate ways has its own drawbacks, is just as time consuming, and has the same potential for causing damage and unwanted down time to the telephone system.

When installing a new phone system, it is optimal to have the phone service to the user (usually a company or other type of business) shut down for as little time as possible. The tedious process of connecting the audio source to the phone system is time consuming and slows down the installation process, thereby keeping the user's phone system down for longer, causing the user to be unhappy and potentially causing loss of business to the user because its customers are unable to reach it.

Therefore, there is a need in the industry for an efficient and timely device to connect the phone system to the audio source so that precious down time is limited and the desired functions of the business telephone system are enabled as quickly and as efficiently as possible.

BRIEF SUMMARY

According to an aspect of the invention, a novel connector is disclosed that is designed to fit directly to the output of an audio source and directly to an input of a telecommunications connecting block used with a business phone system without any tedious wire stripping, splicing, or the danger of shorting, and without the need for any special tools. The connector of the present invention speeds the installation process for the phone system, decreasing the time the system and the phones are down, thereby saving time and money in the installation. A further aspect of the invention is that it provides the advantages described above to a system with stereo capability or video capability.

BRIEF DESCRIPTION OF THE DRAWINGS

FIG. 1 is a block diagram showing connection of the KSU to the telecommunications connecting block and thereby to the CO lines, the audio source, and the telephones;

FIG. 2 is a drawing of an embodiment of the connector of the present invention showing the respective connections to the audio source and to the telecommunications connecting block;

FIG. 3 is a cross-sectional view of the audio output jack shown in FIG. 2 with the insulative material partially removed;

FIG. 4 is the connection between the copper wire and the contact plates of the receptacle portion of the connector;

FIG. 5 is an enlarged view of the receptacle portion of an embodiment of the connector;

FIG. 6 is the telecommunications connecting block showing the pairs of rings to which the connector attaches;

FIG. 7 is an embodiment of the connector showing a cross-sectional view of a stereo jack capable of providing connection in stereo; and FIG. 8 is an enlarged view of the receptacle portion of an embodiment of the connector.

DETAILED DESCRIPTION OF THE PRESENTLY PREFERRED EMBODIMENTS

FIG. 1 is a block diagram showing one embodiment of a business telephone system 110 of the present invention. The phone system may be a PBX, Key or other type of business telephone system. In FIG. 1, the central processing unit, sometimes called a Key System Unit (KSU) 10, includes within it all of the programming for the business phone system 110. The KSU 10 is connected via a twisted pair cable 20, sometimes a twenty-five pair, although fifty, one hundred, and one thousand pair cables may be used as well, to telecommunications connecting block 30. The telecommunications connecting block 30 is connected to all of the phone extensions in the business telephone unit 110. The telecommunications connecting block 30 receives input from the central office (CO) lines 40 and from the audio source 50. The telecommunications connecting block 30 may receive other inputs as well, but discussion of these other inputs is not necessary for the present invention. The telecommunications connecting block 30 may be a sixty-six block, one-ten block, or other known connecting block commonly made by Hubble Inc., AMP Incorporated, or Siemens Inc. It has several pairs of contacts or pegs 34 (FIG. 6) to which various inputs are connected. The CO lines 40 bring in the outside lines that service the phone system. It is known in the art that there may be multiple CO lines, ranging anywhere from 1 to almost an unlimited number, depending on the size of the business telephone system and the needs of the company it services. Through the programming in the KSU 10, however, each separate extension in the phone system need not have its own separate CO line. The KSU 10 is programmed, inter alia, to connect an extension with a free CO line upon activation of a specific code, i.e., dialing 9. Programming of the KSU is well known in the art, however, and the basic information is provided here simply to give context to the present invention. The audio source 50 also connects to the telecommunications connecting block 30, and its operations also are controlled by the KSU 10. Of course, the audio source 50 could be any type of audio output such as music, a message, an advertisement, or the radio. It is called a audio source 10 herein for ease of description, and not for limitation.

In operation, when a call comes in to a specific extension, and the KSU 10 detects that the desired extension is not taking calls, possibly because it is in use, or for some other reason, the KSU 10 may be programmed to put the incoming call on hold. In addition, the individual at the destination extension may also place the caller on hold, after answering the call. While the call is holding for the desired extension, the KSU 10 may be programmed to connect the holding call to the audio source 50 via the output of the audio source 52 connected to a specified pair of contact pegs 34 (FIG. 6) of the telecommunications connecting block 30, and hence under the control of the KSU 10.

It is the connection between the output 52 of the audio source 50 and the pair of contact pegs 34 on the telecommunications connecting block 30 that is the focus of this invention. FIG. 2 shows one embodiment of the present invention. In the embodiment of FIG. 2, the audio source 50 is a typical audio device such a CD player, a cassette player, or a receiver. Connecting to the output 52 requires an audio jack 62. There are many different types of audio jacks known in the industry such as miniplugs or standard plugs, jacks with stereo capability, and jacks with audio/video capability—referred to specifically as video jacks. The specific audio jack used in the Figures is meant for illustration and not limitation. The jack 62 has a single metallic lead that fits snuggly into the audio output 52. In one embodiment, the audio jack 62 is a mono audio jack. However, in another embodiment, a stereo audio jack may be used, and in a further embodiment, a video jack may be used. Video jacks can include audio capability or not depending on the specific field of use.

Referring again to FIG. 2, the jack 62 has insulative material 66 around the metallic lead 64 in the location that does not mate with the output 52 of the audio source 50. The metallic lead 64 is terminated inside the insulative material 66, to audio wire 68. In the present embodiment, audio wire 68 is covered with sheathing 65, and underneath the sheathing 65 it is made up of two internal wires: stranded copper wire 67 and stranded copper wire with additional sheathing 69 as shown in FIGS. 3 and 4.

Specifically, in FIG. 3, audio plug 60 is shown with a portion of its protective, insulative material 66 removed. Inside, the metallic lead 64 is connected to the two internal wires 67 and 69, described above. The two internal wires 67 and 69 then leave the insulative material 66 covered by sheathing 65. Sheathing 65 is removed at one end to show that the two internal wires 67 and 69 are underneath sheathing 65, and all three 65, 67, and 69 make up audio wire 68.

The audio wire 68 can be of varying lengths. It's length depends on the distance between the audio source 50 and the telecommunications connecting block 30. If the distance between the two is short, a small amount of audio wire 68 is necessary; however, a further distance requires more wire 68. And different versions of the connector having varying lengths of wire are contemplated by this invention.

Turning now to FIG. 4, the audio wire 68 terminates at the end opposite to the jack 62 into receptacle portion 70. For purposes of illustration, the protective housing 74 (FIG. 5) of receptacle portion 70 has been removed in FIG. 4. At the termination point of the audio wire, each of the two internal wires 67 and 69 is connected to a pair of conductive plates 72a and 72b or 73a and 73b that come together at the wire 67 or 69 termination. These plates may be made of metal or other conductive material. The connection point of the two internal wires 67 and 69 with the pair of conductive plates 72a, 72b, 73a, 73b, called the rear portion 72d and 73d, is surrounded by a protective housing 74 as shown in FIG. 5. The protective housing 74 protects the connection during application, either from outside stimuli or from the two internal wires 67, 69 making contact. A portion of the sheathing 65 is removed at the end of wire 68 shown in FIG. 5 to illustrate that the two internal wires 67 and 69 are separated and connected to different pairs of conductive plates, either 72a, 72b, or 73a, 73b. It does not matter which internal wire 67 or 69 is connected to which pair of conductive plates 72a, 72b, or 73a, 73b.

In FIG. 5, the pairs of conductive plates are covered by protective housing 74, and the side of receptacle portion 70 opposite to that connected to the two internal wires 67, 69 includes open face 75. Open face 75 includes front portion 72c and 73c (FIG. 4) that is designed to mate easily with the designated pair of pegs 34 on the telecommunications connecting block 30 in FIGS. 1 and 6. Open face 75 has connection sites of the two pairs of conductive plates 72a, 72b, 73a, 73b. One conductive plate of each of the pair 72a and 72b, and 73a and 73b fits snugly on either side of corresponding contact peg of pair 34 at the designated location on the telecommunications connecting block 30. The designated location is the connection point programmed in the KSU 10 to receive the audio input from the connector 100.

The receptacle portion 70 replaces several steps in a tedious and time consuming process. It eliminates the need in the prior art to carefully remove the sheathing 65 of the audio wire 68 so as not to harm the delicate pair of stranded copper wire underneath, and the need to carefully remove the sheathing from the internal stranded copper wire 69 for connection. The receptacle portion 70 also eliminates the need in the prior art to separate and to meticulously wrap each stranded copper wire 67, 69 around one of the two small pegs from the designated pair 34 on the telecommunications connecting block 30 that represent the programmed location for the audio source input 32. Thus, the receptacle portion 70 eliminates the hazard of the prior art that if even one of the stranded cables from one peg touches the other peg, it may cause the phone system to short out and may resort in damage to the system, but certainly will delay completion of the installation.

In another embodiment, the business telephone system 110 has stereo reception capabilities. The connector 100, therefore, can provide for a stereo connection between the audio source 52 and the KSU 10. In this embodiment, shown in FIG. 7 with the insulative material of the audio jack partially removed, a stereo audio plug 80 is used at the end of the connector 100 that connects with the audio source 52. The stereo audio plug 80 is similar to the audio plug 60 except that metallic lead 84 terminates inside the insulative material 86 to two audio wires 83a and 83b. Audio wires 83a and 83b each are made up of at least two internal wires: stranded copper wire 87 and stranded copper wire 89 with additional sheathing as shown in FIG. 7. Wires 87 and 89 are similar to wire 67 and 69 decribed in a foregoing embodiment, but there are two pairs of them. Upon leaving the insulative material of the audio jack, audio wires 83a and 83b are held together as wire 88 under protective insulation 85, as shown in FIG. 7 partially removed for illustration purposes.

The audio wire 88 underneath protective insulation 85 terminates into receptacle connector 90, FIG. 8. At the termination point, each of the wires 83a and 83b are connected to respective receptacle contact portions as was shown for a single wire 68 in the preceding embodiment. Wire 83a, for example, including wires 87 and 89 can be connected to conductive plates 91a, 91b, and 92a, 92b, respectively; and wire 83b including a further set of wires 87 and 89 can be connected to conductive plates 93a, 93b, and 94a, 94b, respectively, as shown in FIG. 8. The pairs of conductive plates 91a, 91b, 92a, 92b, 93a, 93b, and 94a, 94b are surrounded by an insulative housing 96. The housing 96 protects the connection during application, either from outside stimuli or from either set of the two internal wires 87, 89 making contact.

Further, in FIG. 8, the side of receptacle portion 90 opposite to that connected to the two sets of internal wires 83a and 83b includes open face 95. Open face 95 is designed to mate easily with the two sets of designated pairs of contact pegs 34 on the telecommunications connecting block 30. Open face 95 has two connection sites. One including the first pairs of conductive plates 91a, 91b, 92a, 92b, and one including the second pairs of conductive plates 93a, 93b, 94a, 94b. A conductive plate of each of the pair 91a and 91b, and 92a and 92b fits snugly on either side of corresponding contact peg of pair 34 at the designated location on the telecommunications connecting block 30. Similarly, a conductive plate of each of the pair 93a and 93b, and 94a and 94b fits snugly on either side of a second corresponding contact peg of another pair 34 at the designated location on the telecommunications connecting block 30. The receptacle portion 90, therefore, is capable of providing stereo input to the KSU 10 via the telecommunications connection block 30, and the KSU 10 then routes the stereo input to the appropriate incoming call placed on hold.

As a result of the foregoing detailed description of the connector of the present invention including connecting the audio plug to the output of the audio source and connecting the open face to the designated pair(s) of pegs in the telecommunications connecting block, quick and efficient assembly of the music or other type of audio on hold part of the telephone system is achieved, without the need to perform timely stripping and splicing of delicate stranded wires, necessary in the prior art.

Of course other types of connections between the audio output of the audio source and the audio wire are possible depending on the type of audio device employed. For example, if a video phone system is available, the caller placed on hold could watch a video input such as from a DVD or Beta system. The connector of the present invention would be used to connect the video output from the video source directly to the telecommunications connecting block of the video phone system central processing unit.

Similarly, other types of connections to the KSU, or other type of processing unit in a business phone system, are possible depending on the type of phone system being installed.

From the above disclosure of the general principles of the present invention and the preceding detailed description, those skilled in the art will readily comprehend the various modifications of which the present invention is capable. Therefore, the scope of the invention is delimited by the following claims and equivalents thereof.

What is claimed is:

1. A connector for a telephone system including audio on hold capabilities comprising:
    an audio jack including an audio plug configured to mate with an output from an audio source;
    a pair of wires each having a first end and a second end and each connected at the first ends to the audio plug;
    the first wire connected at the second end to a first pair of conductive plates; and
    the second wire connected at the second end to a second pair of conductive plates; wherein the first and second pair of conductive plates are configured to form an electrical connection with contact pegs in a telecommunications connecting block that is operable to receive more than one central office line and to provide an electrical signal to callers on the more than one central office line.

2. The connector of claim 1 configured to transmit stereo signals from the output of the audio source to the telecommunications connecting block.

3. The connector of claim 1 wherein the pair of conductive plates includes a metal plate.

4. The connector of claim 1 wherein the first wire is a stranded copper wire.

5. The connector of claim 1 wherein the first wire is a stranded copper wire with sheathing.

6. The connector of claim 1 wherein the first wire is suitable for audio transmission.

7. The connector of claim 1 wherein sheathing is wrapped around the first and the second wires.

8. The connector of claim 1 wherein each conductive plate of one of the pairs fits on one side of a peg on the telecommunications connecting block.

9. The connector of claim 1 wherein one of the pairs of conductive plates is configured to connect to the telecommunications connecting block by placing one plate of the one pair on either side of a peg of the telecommunications block.

10. The connector of claim 1 wherein the pairs of conductive plates on the receptacle connector are covered by a housing.

11. The connector of claim 10 wherein the housing has an open face comprising a front part of one pair of conductive plates configured to mate with a peg on the telecommunications connecting block.

12. The connector of claim 11 wherein one pair of metal plates has a rear part and the rear part is connected to the second end of one of the pair of wires.

13. A telephone system comprising:
a central processing unit programmed to direct operations of the telephone system;
a telecommunications connection block operable to receive more than one central office line and operable to receive direction from the central processing unit via a twisted pair cable;
at least one telephone configured to be connected to the telecommunications connection block;
an audio source including an output;
an electrical connector for connecting the audio source to the telecommunications connection block including an audio jack and a pair of conductive plates, and wherein the audio jack is configured for connection to the output of the audio source, and the pair of conductive plates is configured for connection to a pair of pegs on the telecommunication connection block such that the audio source provides an electrical signal input to the telecommunications connection block that is operable to provide an electrical signal to the callers on the more than one central office line.

14. The telephone system of claim 13 further comprising:
a wire connected at a first end to the audio jack and at a second end to the pair of conductive plates and wherein the wire is designed to carry an electrical signal.

15. The telephone system of claim 14 wherein the wire further comprises a first stranded wire and a second stranded wire.

16. The telephone system of claim 14 wherein the second end of the wire is connected to a rear end of the pair conductive plates.

17. The telephone system of claim 14 wherein the pair of conductive plates is enclosed within a housing.

18. The telephone system of claim 17 wherein the housing further comprises an open face, and the open face is configured so that a front portion of the pair of conductive plates is exposed.

19. The telephone system of claim 18 wherein the front portion of the pair of conductive plates is configured to make electrical connection with at least one of the pair of pegs on the telecommunications connection block.

20. The telephone system of claim 13 further configured so that the central processing unit is capable of instructing the telecommunications connection block to connect the electrical signal input to the at least one telephone.

21. The telephone system of claim 20 wherein the central processing unit includes a key system unit.

22. The telephone system of claim 13 wherein the connector is configured to transmit stereo electrical signals.

23. A telecommunications connector comprising:
an audio jack including a stereo audio plug configured to mate with an output from an audio source;
a first pair of wires each having a first end and a second end and each connected at the first ends to the stereo audio plug;
the first wire in the first pair connected at the second end to a first pair of conductive plates;
the second wire in the first pair connected at the second end to a second pair of conductive plates;
a second pair of wires each having a first end and a second end and each connected at the first ends to the stereo audio plug;
the first wire in the second pair connected at the second end to a third pair of conductive plates;
the second wire in the second pair connected at the second end to a fourth pair of conductive plates; and
wherein the first, second, third, and fourth pairs of conductive plates are configured to form electrical connections with at least one pair of pegs on a telecommunications connecting block that is operable to receive more than one central office line and to provide an electrical signal to callers on the more than one central office line.

24. The telecommunications connector of claim 23 wherein the stereo audio plug is configured to transmit a first signal to the first pair of wires and a second signal to the second pair of wires.

25. The telecommunications connector of claim 24 wherein the first pair of wires is configured to transmit the first signal to the first and second pair of parallel plates.

26. The telecommunications connector of claim 25 wherein the second pair of wires is configured to transmit the second signal to the third and fourth pair of parallel plates.

27. The telecommunications connector of claim 24 wherein the first, second, third, and fourth pairs of plates are configured to mate with contacts on the telecommunications connection block such that the first signal and the second signal are transmitted to the telecommunications block.

28. The telecommunications connector of claim 27 wherein a central processing unit directs the telecommunications connecting block to connect a phone to first and second signals.

29. A connector for a video telephone system including video and audio on hold capabilities comprising:
a jack including a plug configured to mate with an output from an video source;
a wire configured to carry video signals, having a first end and a second end, and connected at the first end to the video plug;
the wire connected at the second end to electrical contacts configured to form an electrical connection with a telecommunications connecting block such that the video signals are transmitted to the telecommunications connecting block operable to connect to more than one central office line and to transmit the video signals to callers on the more then one central office line.

30. The connector of claim 29 further comprising a central processing unit connected to the telecommunications connecting block and configured to direct the telecommunications block to connect the audio/video signals to a video phone.

* * * * *